United States Patent [19]

Rousseau

[11] Patent Number: 4,638,961
[45] Date of Patent: Jan. 27, 1987

[54] MANEUVERABLE PARACHUTE

[75] Inventor: Jacques R. Rousseau, Epinay-sur-Orge, France

[73] Assignee: Aerazur-Efa, Issy-les-Moulineaux, France

[21] Appl. No.: 636,026

[22] Filed: Jul. 30, 1984

[30] Foreign Application Priority Data

Mar. 30, 1984 [FR] France ............................. 84 05099

[51] Int. Cl.$^4$ ............................................. B64D 17/00
[52] U.S. Cl. ..................................... 244/142; 244/152
[58] Field of Search ......................... 244/145, 142, 152

[56] References Cited

U.S. PATENT DOCUMENTS 3,013,753  12/1961  Hughes et al. ...................... 244/145

FOREIGN PATENT DOCUMENTS 2627888   1/1977   Fed. Rep. of Germany ...... 244/152
1381829   11/1964  France ................................ 244/152
965316    7/1964   United Kingdom ................ 244/152
1037928   8/1966   United Kingdom ................ 244/152

Primary Examiner—Galen Barefoot
Assistant Examiner—Lynn M. Fiorito
Attorney, Agent, or Firm—Berman, Aisenberg & Platt

[57] ABSTRACT

The present invention relates to a polymaneuverable canopy and to a process for its control by a parachutist. This canopy comprises windows distributed symmetrically in relation to a main plane of symmetry XY, and control lines connecting together the various windows in such a manner that a pull on one line (3) causes a rotation of the canopy to the right, while a pull on two lines (3, 4) causes a braking or rearward displacement of the canopy when the lines are situated one on each side of the plane of symmetry, and a pull on two lines (3, 5) situated on the same side of the plane of symmetry XY brings about a straight lateral displacement of the canopy.

4 Claims, 11 Drawing Figures

MANEUVERABLE PARACHUTE

BACKGROUND OF THE INVENTION

1. Field of the Invention

The present invention relates to a polymaneuverable canopy and to the process of controlling a canopy of this type for individual parachute equipment intended either for saving passengers or crew from an aircraft in difficulty, or for the landing of parachutists of airborne forces.

2. Description of the Prior Art

Three large families of personnel canopies are known at the present time, which are intended for the above-mentioned uses and which hitherto have been canopies of a generally hemispherical shape:

so-called solid, non-maneuverable canopies, that is to say canopies generally not equipped with apertures for the escape of air through the dome, and which descend practically vertically through the atmosphere. The majority of canopies in use are still of this type. They have the disadvantage of the lack of maneuverability.

Steerable canopies: these canopies comprise domes in which suitable cutouts or openings are provided, more particularly on their rear faces, or else air escape nozzles, so arranged that the resulting flow or lift dissymmetrical to the aerodynamic plane will generate a resultant force directed towards the front of the ca thus causing the latter to move in that direction. It is customary to say that these canopies have a forward drive. This type of canopy is known in particular from French Pat. No. 1,550,628, British Pat. No. 1,037,928, and U.S. Pat. No. 3,343,769. Their steerability is achieved with the aid of two maneuver controls, left and right, connected symmetrically to the rear part of their dome, for the purpose of turning the canopy to the right and left respectively when the parachutist pulls down the right-hand and left-hand controls respectively, and of braking the forward movement of the canopy when the parachutist operates both controls symmetrically.

Although these canopies have the advantage of being steerable, nevertheless they have numerous operational disadvantages.

For these canopies, the permanence of their forward drive is incompatible with high density mass jumps because of the considerable increase in the frequency of collisions during descent, particularly in the first few moments after the opening of the canopies of parachutists who have just jumped, for example, from the two side doors of the carrier aircraft. Since the canopies open in directions which are distributed in random fashion, it frequently occurs in fact that two canopies will open in such a manner that their directions of advance will be opposite to one another and that consequently the parachutists will collide without having time to react.

Moreover, in jumps from very low altitudes the parachutist does not always have time to change the direction of his horizontal movement by turning so as to make his landing in a position favoring safety, because as a rule it is attempted to land facing the wind. In cases where the parachutist has not succeeded in turning his parachute to face the wind by making a suitable turn, his resultant ground-speed of advance may be high, because it may be the sum of the parachute's forward drive and the velocity of the wind.

Finally, this type of parachute used as a rescue parachute may be the cause of landing mishaps. The user, who is usually not trained in parachute jumping disciplines, and who in addition is often subject to psychological traumatism caused by his bailing out, is in fact not always able, or does not always have the automatic reflex required, to take advantage of the steerability of the canopy in order to ensure his safe landing, if necessary by avoiding certain obstacles on the ground, such as trees for example, and by assuming a position facing the wind.

Finally, although these parachutes very often make it possible for the relative speed of impact with the ground to be reduced on landing by an amount equal to the speed of the parachute itself, on the other hand they have the disadvantage that, when the velocity of the wind is greater than the parachute's forward drive contact is made with the ground in the opposite direction to the forward drive.

Finally, a last type of canopy comprises canopies having directional maneuverability. These more recent canopies are those disclosed in the patents filed in France under No. 75/19,553 now French Pat. No. 2,315,435 and No. 76/07,252 now French Pat. No. 2,343,650, by the firm AERAZUR.

These canopies have the advantage of not having a forward drive, so that they considerably increase the safety of mass jumps of airborne forces, and of not having a speed of impact with the ground higher than the wind speed. In addition, these canopies permit a certain lateral or axial maneuverability because, generally by pulling two maneuver controls, it is possible to reduce the speed of horizontal displacement due to the relative wind and to land at a lower resultant speed of advance.

However, these canopies still have two disadvantages due to the lack of rotational maneuverability. The parachutist is in fact often directed in a direction which does not always enable him to see any obstacles on the ground in his direction of movement, and with these canopies he is not able to make a turn in order to face the obstacles. Finally, because of his horizontal movement in a random direction, the landing may be made in any direction in relation to that of the resultant speed of movement.

SUMMARY OF THE INVENTION

The present invention seeks to obviate the disadvantages mentioned above, while retaining the operational advantages of the various canopies.

Thus, a first aim of the invention is to obtain a canopy which remains neutral but which enables the parachutist, by pulling a maneuver control, to modify his direction as desired, in order in particular to assume a position with the wind behind him and to brake his drift velocity by simultaneously pulling two maneuver controls in such a manner as to land under the best possible conditions of safety.

The first aim is achieved in particular through the fact that the polymaneuverable canopy comprises at least three maneuvering windows distributed over the dome in such a manner that the canopy has a main plane of symmetry perpendicular to the shoulder line of the parachutist, each window having two edges, and a plurality of maneuver control means effecting a coupling between two opposite edges of different windows, the opposite edges of the windows being situated on the same side of the main plane of symmetry.

According to another characteristic, the canopy comprises four windows distributed over the dome symmetrically in relation to the main plane of symmetry perpendicular to the shoulder line of the parachutist, and in relation to a second vertical plane of symmetry perpendicular to the first plane, first maneuver control means connecting a first edge of a first window to the second opposite edge of a second window disposed symmetrically in relation to the second plane of symmetry, and second control means connecting the second edge of the first window to the first edge of the second window.

According to another characteristic, the canopy comprises a pair of control means disposed on each side of the main plane of symmetry.

Another object of the invention is a process for the control of a polymaneuverable canopy.

This aim is attained through the fact that the parachutist applies traction to a single control means in order to effect a rotation in the direction corresponding to the side on which the control means to which traction is applied is situated;

through the fact that the parachutist applies traction to a pair of control means situated one on each side of the main plane of symmetry and on one and the same side of a plane perpendicular to this main plane for the purpose of effecting the braking or axial displacement of the parachute; and through the fact that the parachutist applies traction to a pair of control means situated on one and the same side of the main plane of symmetry in order to effect a braking or lateral displacement.

Thus, as can be seen, the polymaneuverability of the parachute, which imparts to it its multi-purpose utilizability, is controlled by the parachutist solely with the aid of four maneuver controls.

BRIEF DESCRIPTION OF THE DRAWINGS

Other characteristics and advantages of the present invention will emerge more clearly from the following description, which is given with reference to the accompanying drawings, in which.

DESCRIPTION OF THE PREFERRED EMBODIMENTS

Figure 1:
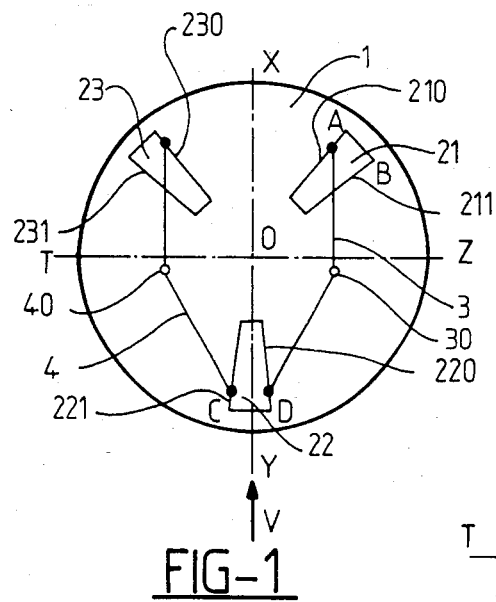
FIG. 1 shows a diagrammatical plan view of a rotationally maneuverable canopy in its neutral position, that is to say without any action on the maneuver controls.

FIG. 1 shows a plan view of a hemispherical canopy 1 provided with three windows distributed symmetrically in relation to a plane of symmetry XY representing the front-rear direction of the parachutist, the semiaxis OX representing the front side of the parachute/parachutist.

Contrarily to what the figure suggests the three windows are not necessarily distributed in accordance with preferred angles, but are simply disposed symmetrically in relation to this plane XY. The three windows 21, 22 and 23 each have two opposite edges essentially parallel to the gores of the hemispherical canopy. As can be seen in FIG. 1, a control line 3, provided at its end with a control handle 30, makes it possible to connect that edge 210 of the window 21 which is closest to the axis of symmetry XY to the edge 220 of the window 22 which lies to the rear of the axis of symmetry TZ perpendicular to the axis of symmetry XY and situated on the same side of the plane XY. A second line 4 makes it possible to connect the edge 230 of the window 23, which is the edge closest to the axis of symmetry XY, to the edge 221 of the window 22, which is the edge situated on the same side of the plane XY as the window 23. This control line 4 carries at its center a control handle 40. It is quite obvious that each of the lines 3 and 4 may consist of a single cord or of two cords forming a V and connected to a cord which extends down to the level of the parachutist, so that the latter can operate it.

Figure 2:
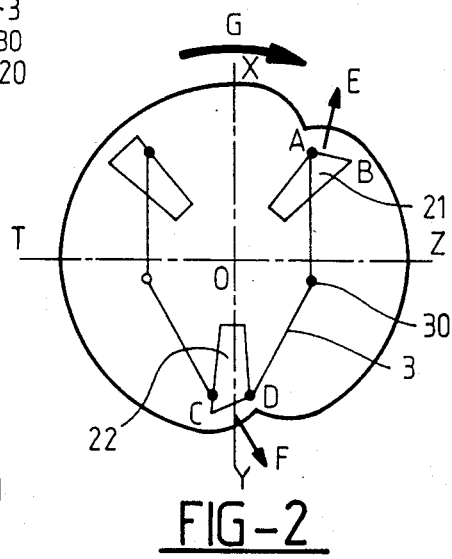
FIG. 2 shows a plan view of the same canopy when the right-hand control is pulled down, thus bringing about a rotation to the right.

In FIG. 2 can be seen a plan view of the canopy after the parachutist has pulled the line 3 by means of the handle 30. As will be understood, the axis TZ also represents the line of the shoulders of the parachutist and the direction OX indicates the front, that is to say the direction in which the parachutist normally faces. After traction has been applied to the line 3, the segment AB of the window 21, which in FIG. 1 had substantially a direction forming an angle of 45° relative to the plane TZ, will pivot and form with the line TZ an angle much smaller than 45°, as shown in FIG. 2. In this way, the original orientation of the plane formed by the edge of the window will be modified and its new orientation will force the air to flow through the window with a new orientation E more parallel to the axis XY. Similarly, the edge CD of the window 22 will also be moved by the line so as to pivot in such a manner as to form an angle with the axis TZ, whereas in the position of rest it was parallel to the axis TZ. The simultaneous modification of the orientations of the windows 21 and 22 has the effect that the respective air flows E and F generate, by reaction, forces in the same direction but in the opposite sense to E and F, these forces no longer passing through the center O of the canopy, and consequently generate a drive torque entailing the rotation of the canopy in the direction indicated by the arrow G. This rotational torque has a strength twice that of the torque produced by the deformation of a single window 21. Consequently, all other factors being the same, the pulling of a single line makes it possible to obtain a substantially higher rate of rotation of the canopy, even twice as high, in comparison with rotational canopies of conventional type.

Figure 3:
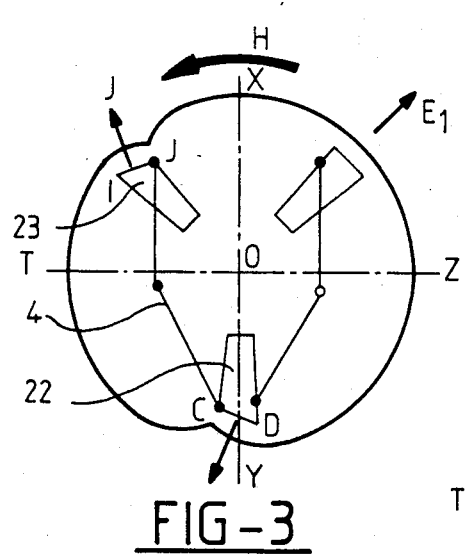
FIG. 3 shows a plan view of the same canopy when the left-hand control is pulled down, thus bringing about a rotation to the left.

FIG. 3 shows a view from above of the same canopy, in which the parachutist is operating the line 4, which brings about a deformation of the edge CD of the window 22 and of the edge IJ of the window 23, in such a manner as to give rise to a rotation in the opposite sense to the arrow G, this rotation being represented by the arrow H.

Figure 4:
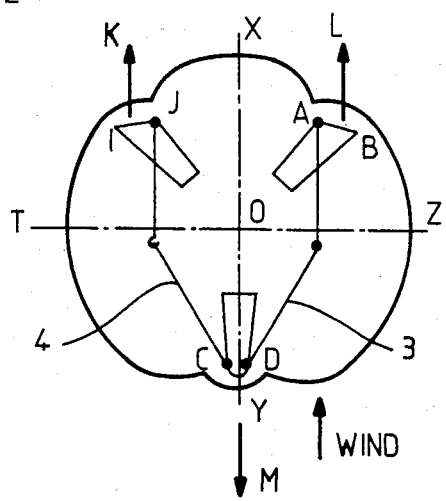
FIG. 4 shows a plan view of the same canopy when downward traction applied to both controls effects braking or rearward displacement.

As can be seen, with this type of canopy traction on the left side brings about a rotation to the left, represented by the arrow H, and traction on the right side brings about a rotation to the right, represented by the arrow G. FIG. 4 shows that simultaneous traction applied to the lines 3 and 4 deforms the windows 21 and 23 symmetrically and deforms the window 22 in such a manner as to reduce its base CD. The flows L and K resulting from the deformations of the plane of the windows 21 and 23 create a resultant reaction force in the direction XY and in the sense OY, the strength of which is practically twice that created by the flow M and which is applied in the sense OX. The resultant reaction in the sense OY will have the effect of moving the canopy in the same sense, that is to say towards the rear.

Thus, the parachutist, who after having assumed an orientation with a back wind configuration by pulling a single maneuvering line 3 or 4, will be able to reduce the speed of movement and thus present himself for landing under optimum conditions of safety by simultaneously pulling these two cords.

As will be understood from the different views shown, a black dot on the handle signifies that traction is being applied to the corresponding line, while a blank circle means that the line is not being pulled and that consequently the edges to which the ends of the line are attached are not undergoing any deformation.

Figure 5:
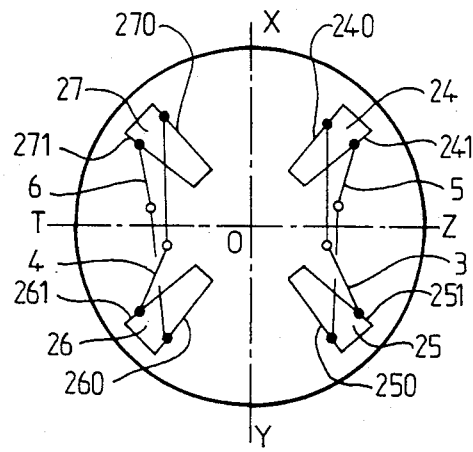
FIG. 5 is a plan view of a polymaneuverable canopy in the situation in which the canopy behaves like a neutral canopy.

FIG. 5 shows a diagrammatical view from above of a polymaneuverable canopy the configuration of which ensures perfect maneuverability. This canopy comprises four windows 24 to 27, distributed symmetrically in relation to the axis XY and in relation to the axis TZ representing the shoulder line of the parachutist. The semiaxis OX represents the front side of the parachute, that is to say the direction in which the parachutist's face is normally directed.

The windows situated on the same side of the plane XY are connected by line systems. As can be seen in FIG. 5, the inner edge 240 of the window 24 is connected to the outer edge 251 of the window 25 by a line 3. This arrangement is substantially identical to the arrangement shown in FIG. 1. Similarly, a line 4 connects the inner edge 270 of the window 27 to the outer edge 261 of the window 26. As has previously been explained, the lines 3 and 4 are of sufficient length to be within reach of the parachutist's hands. Similarly, a line 5 connects the outer edge 241 of the window 24 to the inner edge 250 of the window 25. Finally, a line 6 connects the outer edge 271 of the window 27 to the inner edge 260 of the window 26. The lines 5 and 6, like the lines 3 and 4, are of sufficient length to be within reach of the parachutist's hands, so that he can pull them in order to deform the windows. In known manner, these lines may consist of a single piece or of two cords forming a V, these cords forming a V being if necessary extended by a bottom cord giving the whole arrangement a sufficient length to reach the height of the parachutist's hands. Likewise in known manner, this bottom cord or the main cord may be provided with a gripping handle in order to facilitate its operation.

Figure 6:
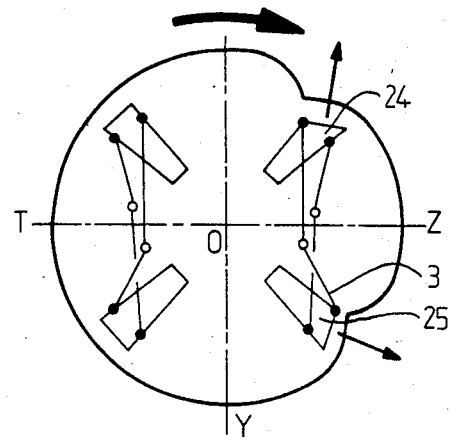
FIG. 6 shows a plan view of the polymaneuverable canopy when the latter undergoes downward traction of the control causing a rotation to the right.

FIG. 6 shows the shape assumed by the canopy as the result of traction applied to the line 3, this traction being represented by a black dot. In the manner previously explained, this traction deforms the windows 24 and 25 and, as has already been explained in connection with FIG. 2, brings about a rotation of the canopy.

Figure 7:
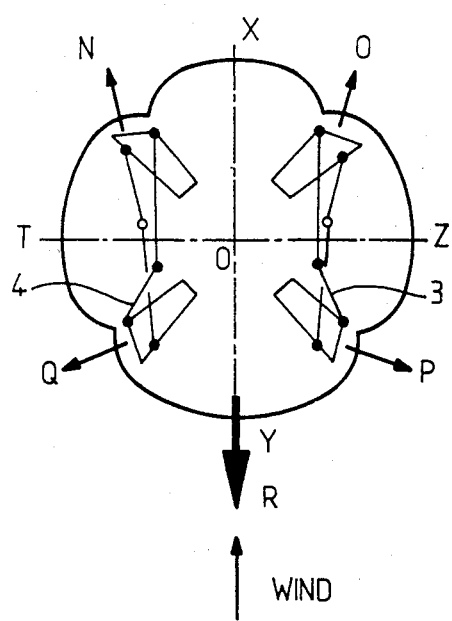
FIG. 7 shows a plan view of the polymaneuverable canopy when the latter undergoes downward rearward traction of the controls causing braking or displacement.

FIG. 7 shows the shape assumed by the canopy and the windows when traction is applied to the lines 3 and 4 connected to the inner edge of the front windows. In this figure the arrows N, O, P and Q represent the resultants of the outflows caused by the deformations of the windows, and the arrow R represents the propelling force resulting from these outflows. As can be observed, when the parachutist has assumed a rear wind orientation, this resultance R is in the opposite direction to that of the wind and therefore contributes towards reducing the speed of movement of the canopy caused by the wind. Consequently, the canopy is braked.

Figure 8:
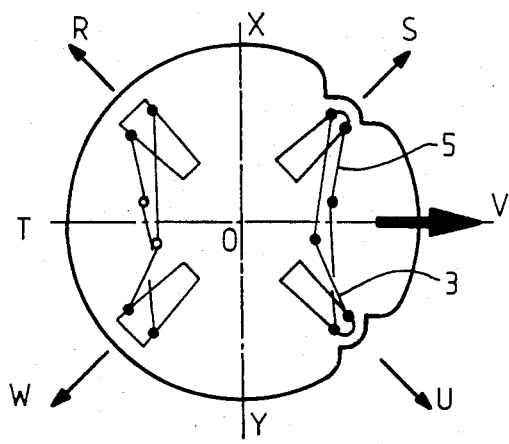
FIG. 8 shows a plan view of the polymaneuverable canopy when the latter undergoes downward traction of the controls causing braking or transverse displacement.

FIG. 8 shows the shape assumed by the canopy and the windows when the lines situated on the same side of the plane of symmetry XY are pulled. In the example shown in FIG. 8, it is the lines 3,5 which are operated and which reduce the size of the apertures of the windows in such a manner as to produce flows S, U whose strength is lower than that of the flows R and W of the air through the undeformed windows. The reaction force resulting from these four flows, and represented by the arrow V, therefore forces the canopy to move in the same direction, that is to say laterally to the right. Thus, by pulling on the lines situated on the same side of a shoulder or on the same side of the axis XY, the lateral displacement of the canopy will be brought about, as indicated in FIG. 8. If the lines 4, 6 had been selected instead of the lines 3, 5, the displacement of the canopy would take place in the direction of the semiaxis OT.

It is quite obvious that in the case of FIG. 7, in which the parachutist is in a rear wind configuration, if the lines 5 and 6 had been pulled instead of the lines 3 and 4, the parachute would have advanced with the wind and would therefore have undergone acceleration instead of undergoing braking. Thus, in this configuration, the pulling of the two lines connected to the inner edge of the front windows brakes the parachute, whereas if the lines connected to the outer edge of the front windows of the canopy are pulled, the parachute is accelerated. On the other hand, the pulling of the lines situated on the same side of the plane of symmetry XY brings about a lateral displacement of the canopy which, when the wind is acting in that direction, enables the canopy to be either braked or accelerated. Finally, if only one line is pulled, preferably the line connected to the inner edge of the front window, a rotation is brought about in the sense dictated by the half plane in which the line pulled is situated. Thus, by pulling the line 3 which is situated in the right-hand half plane in relation to the plane XY, a rotation to the right is brought about, whereas by pulling on the line 4 connected to the inner edge of the left-hand front window, a rotation to the left is brought about. On the other hand, if the right-hand line 5 connected to the outer edge of the right-hand front window is pulled, a rotation to the left will be brought about, and similarly if the left-hand line 6 connected to the outer edge of the left-hand front window of the canopy is pulled, a rotation to the right will be brought about. Therefore, in cases where the lines connected to the outer edge of the front windows are pulled, the directions of rotation are reversed in relation to the side on which the cords are pulled.

Figure 9:
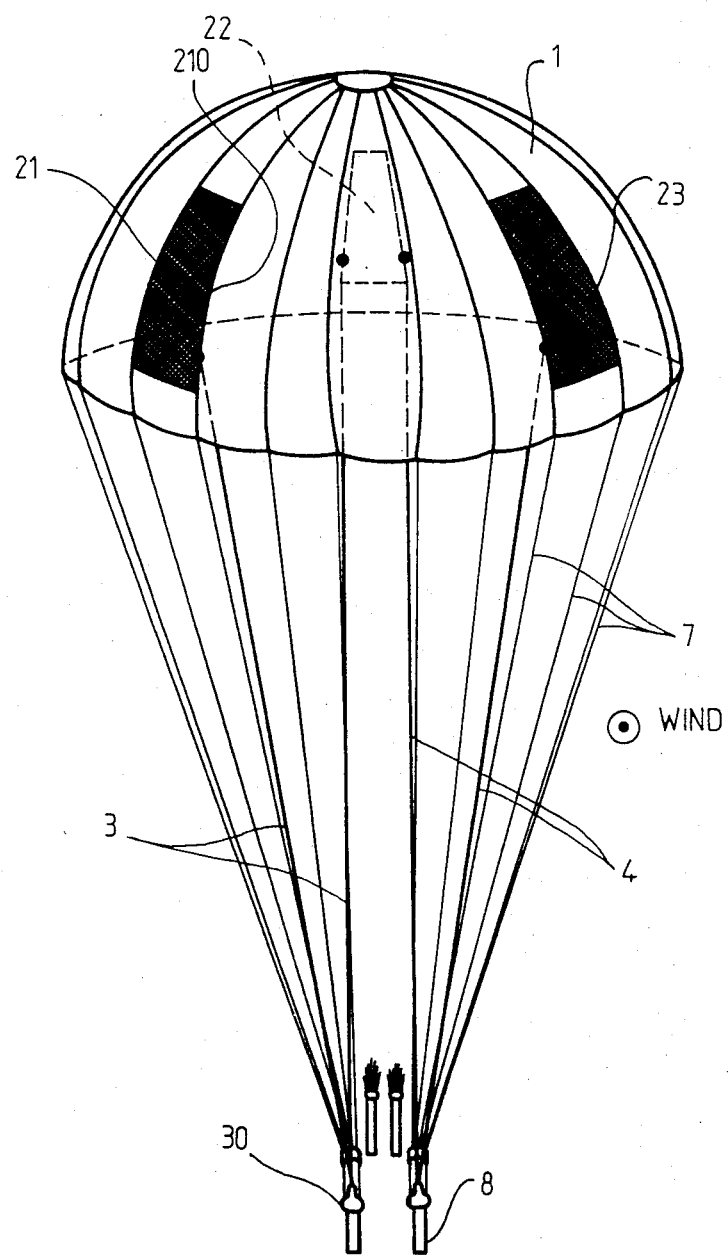
FIG. 9 shows a front view of the canopy of FIG. 1 in its neutral configuration.

FIG. 9 shows a front side view of the canopy of FIG. 1, when this canopy behaves in a neutral manner. The supporting suspension lines 7 connect the edges of the canopy 1 to the parachutist's harness 8. The windows 21 to 23 are cut out in the gores and may, if necessary, occupy the width of one or more gores or panel sections. The maneuvering lines 3, 4 are connected to the edges of the windows 21, 22, 23 in the bottom half of these windows, as shown in FIG. 1. The line 3 forms a V, at the end of which is situated the pull ring 30 or the operating handle.

Figure 10:
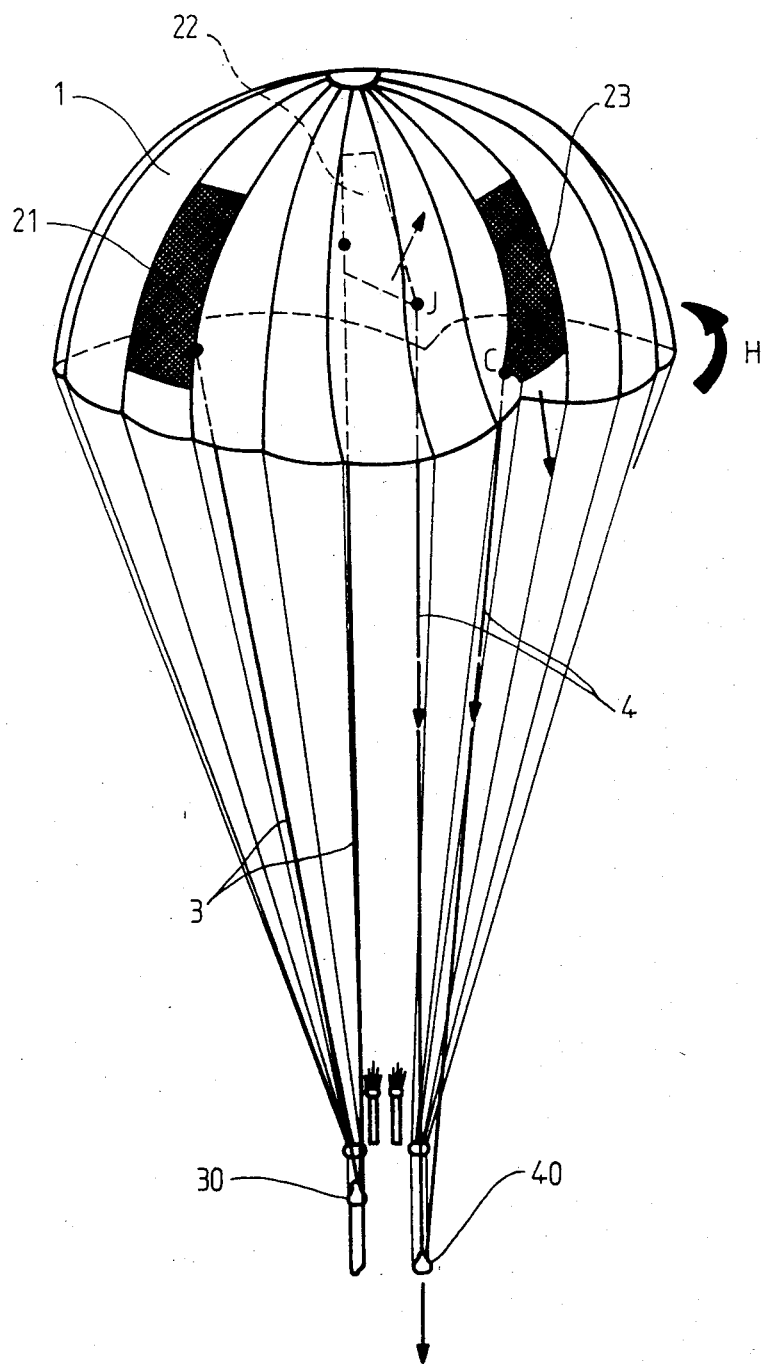
FIG. 10 shows a front view of the canopy corresponding to the situation shown in FIG. 3.

FIG. 10 shows a front side view of the canopy of FIG. 1, in the case where this canopy is driven rotationally to the left, as illustrated in FIG. 3. As can be seen, pulling on the handle 40, and consequently on the left-hand maneuvering line 4, brings about an advance towards the interior of the points J and C, and consequently a pivoting of the surface of the windows in the direction of the center O of the canopy. This pivoting has the effect of modifying the direction of the air flow resultants, as indicated in FIG. 3, in such a manner that these resultants no longer pass through the center O, whereas the air flow resultant $E_1$ of the window 21 of FIG. 3 still passes through the point O. Thus, the pivoting movements of the windows 23 and 22 due to the displacements of the points C and J towards the interior results in a modification of the sense of the air flow through each of these windows, thus giving rise to the rotation of the canopy in the sense of the arrow H.

Figure 11:
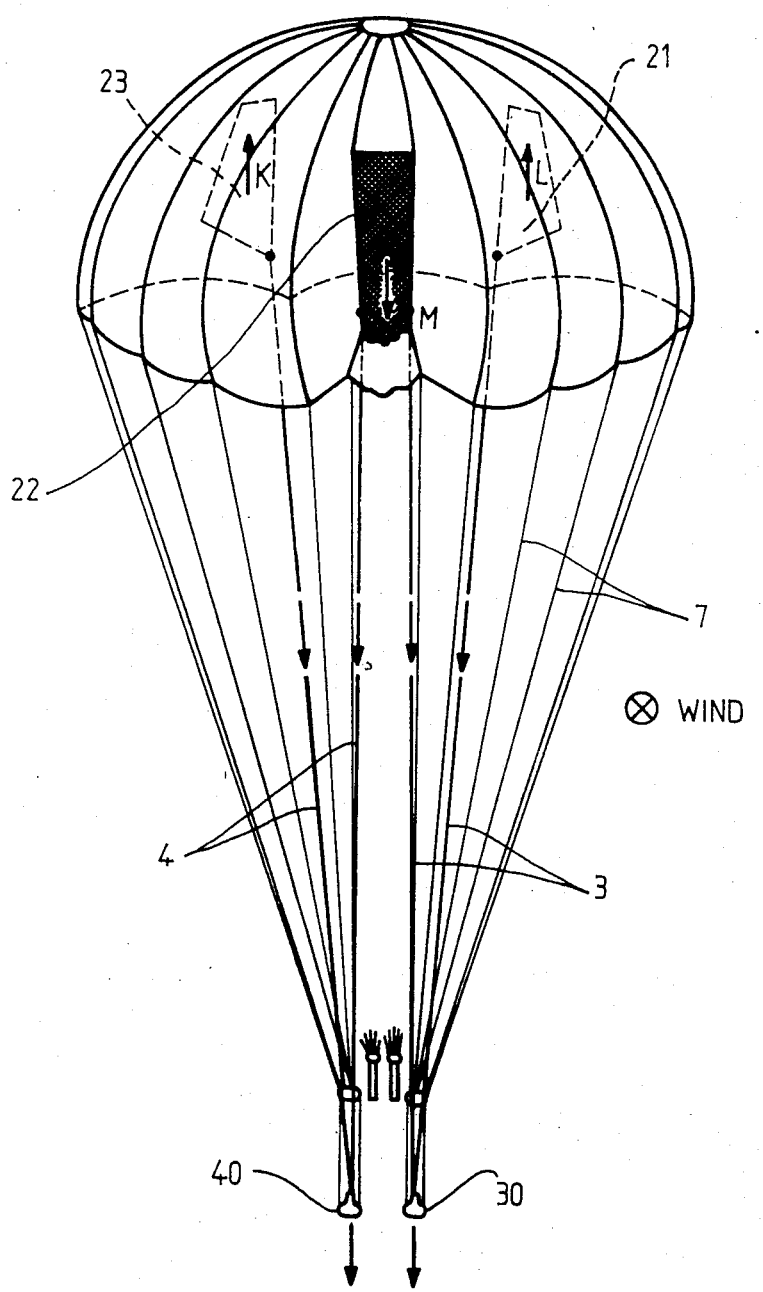
FIG. 11 shows a rear view of the canopy corresponding to the situation in FIG. 4.

FIG. 11 shows a rear side view of the canopy of FIG. 1 in the case where the canopy is subjected to traction on its two control line 3, 4, as illustrated in FIG. 4. The vector representing the sense of action of the wind is shown by an arrow viewed from the rear. In this figure can be seen the reduction of size of the bottom portion of the rear window 22, which reduces the flow of air M towards the rear, whereas the deformations of the windows 21 and 23 increase the axial intensity of the resultant due to the flows L and K. The reaction resulting from these three flows is a vector in the same direction as the wind but in the opposite sense, and consequently the canopy is slowed down in its driven movement due to the wind.

As can be understood in the light of the foregoing explanations, a canopy has thus been produced which, if no action is applied to the control lines, behaves in a perfectly neutral manner and which, in dependence on the action on the lines, can undergo a rotation, a braking, an acceleration or a lateral or axial displacement, thus corresponding perfectly to the definition of a polymaneuverable canopy.

The present invention is not limited to the examples of embodiment which have been described above, but on the contrary is capable of modifications and variants which will be evident to those versed in the art.

What is claimed is:

1. A maneuverable parachute operable by a parachutist, comprising a plurality of gores which form a canopy, at least three maneuvering windows distributed over the canopy, about a vertical main plane of symmetry perpendicular to a line through shoulders of the parachutist, two of said windows being situated in front of said line, each window having two opposite edges essentially parallel to the gores of the canopy, and at least two maneuver control means, each of said maneuver control means comprising a control handle and line means having two ends, each end connected to a non-neighbouring edge of each of two different windows, said two non-neighbouring edges being situated on the same side of the main plane of symmetry.

2. A maneuverable parachute of claim 1 comprising: four maneuvering windows, each window having an inner edge and an outer edge, said windows being distributed over the canopy symmetrically in relation to the main plane of symmetry, and in relation to a second vertical plane of symmetry, which passes through said line through the shoulders of the parachutist, a first maneuver control means connecting the inner edge of a first window to the outer edge of a second window, a second maneuver control means connecting the outer edge of said first window to the inner edge of said second window, said two windows being disposed symmetrically in relation to the second plane of symmetry, the inner edge of each window being the edge disposed closest to the main plane of symmetry and the outer edge of each said window being the opposite edge, and third and fourth maneuver control means connecting the respective corresponding edges of the other pair of windows.

3. A maneuverable parachute operable by a parachutist comprising a plurality of gores forming a canopy, and four maneuvering windows each having an inner edge and an outer edge, distributed over said canopy symmetrically in relation to a main plane of symmetry of said canopy, said main plane of symmetry being perpendicular to a line through shoulders of the parachutist and in relation to a second vertical plane of symmetry through said line, each window having two opposite edges essentially parallel to the gores of the canopy, and at least a first maneuver control means connecting the inner edge of a first window of a first pair of windows, said pair of windows being situated on the same side of the main plane of symmetry, to the outer edge of a second window of said first pair of windows, said first and second windows being disposed symmetrically in relation to the second plane of symmetry, the inner edge of said first window being the edge disposed closest to the main plane of symmetry and the outer edge of said window being the opposite edge, and at least a second maneuver control means similarly connecting the inner edge of the first one of a second pair of windows to the outer edge of the second one of said second pair of windows.

4. A process for controlling a maneuverable parachute operable by a parachutist, said parachute comprising a canopy having a plurality of gores, said canopy comprising at least three maneuvering windows distributed over the canopy about a vertical main plane of symmetry perpendicular to a line through shoulders of the parachutist, two of said windows being situated in front of said line, each window having two opposite edges essentially parallel to the gores of the canopy, and at least two maneuver control means, each of said means comprising a control handle and line means having a first and second end, said first end being connected to an edge of a window and said second end being connected to a non-neighboring edge of a second window, the said two non-neighboring edges being situated on the same side of the main plane of symmetry, said process comprising applying traction by the parachutist to a single control means for effecting a rotation of the parachute in the direction corresponding to the side on which the control means is situated in relation to the main plane of symmetry, applying traction by the parachutist to a pair of control means situated on the same side in relation to the main plane of symmetry for effecting a lateral displacement of the parachute, and applying traction by the parachutist to a pair of control means situated one on each side of the main plane of symmetry for effecting an axial displacement of the parachute.

* * * * *